Sept. 5, 1961 M. W. SHYNE ET AL 2,998,997
EMERGENCY AIR BRAKE EQUIPMENT
Filed Aug. 24, 1959 3 Sheets-Sheet 1
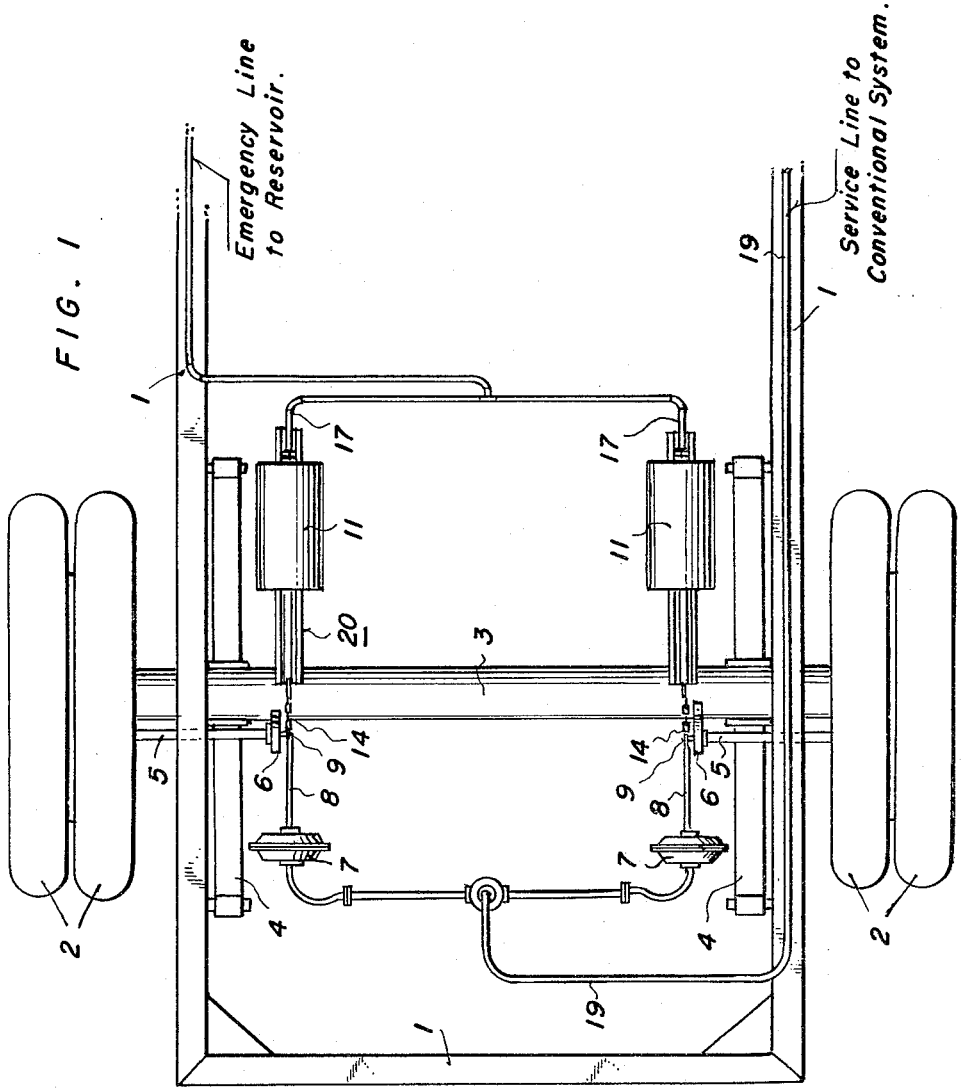
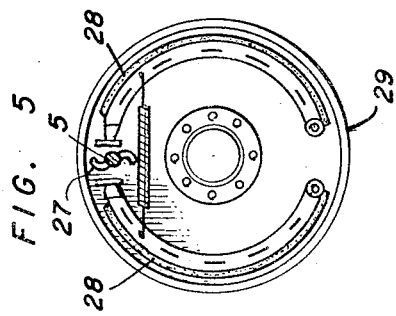
INVENTORS
MAURICE W. SHYNE &
BY JOSEPH R. CATALDI
BY Stone & Mack
ATTORNEYS Sept. 5, 1961 M. W. SHYNE ET AL 2,998,997
EMERGENCY AIR BRAKE EQUIPMENT
Filed Aug. 24, 1959 3 Sheets-Sheet 2
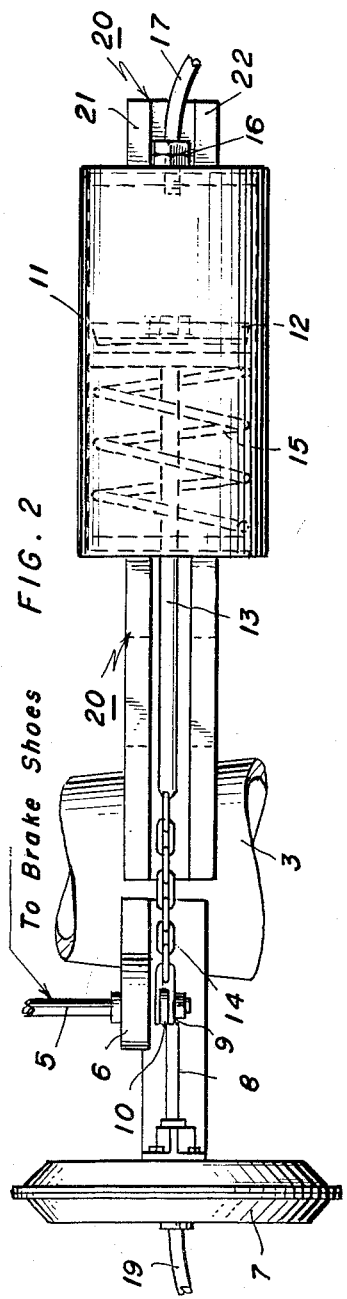
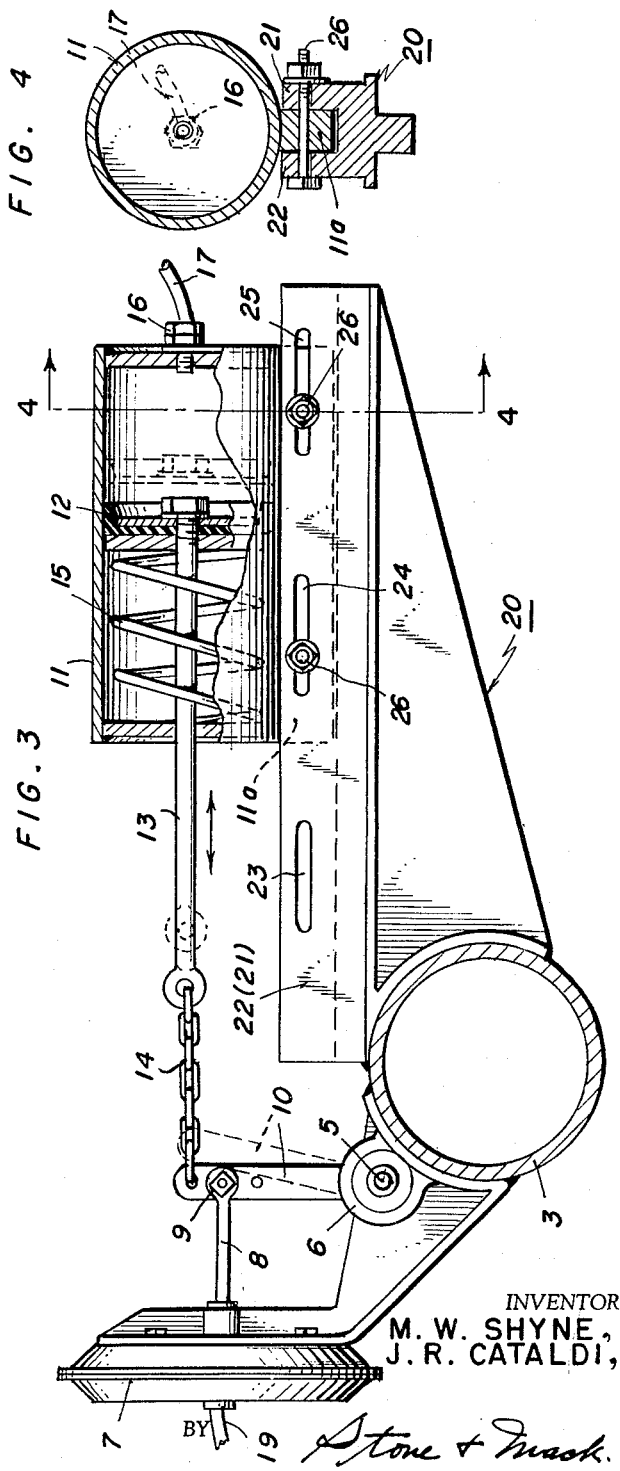
INVENTORS
M. W. SHYNE,
J. R. CATALDI,
BY Stone & Mack
ATTORNEYS Sept. 5, 1961  M. W. SHYNE ET AL  2,998,997
EMERGENCY AIR BRAKE EQUIPMENT Filed Aug. 24, 1959  3 Sheets-Sheet 3

INVENTORS
MAURICE W. SHYNE &
JOSEPH R. CATALDI

BY Stone & Mack
ATTORNEYS

United States Patent Office 2,998,997
Patented Sept. 5, 1961

2,998,997
EMERGENCY AIR BRAKE EQUIPMENT
Maurice W. Shyne, 206 W. 24th St., and Joseph R. Cataldi, 316 E. 20th St., both of Chester, Pa.
Filed Aug. 24, 1959, Ser. No. 835,779
5 Claims. (Cl. 303—9)

This invention relates to safety brakes, and more particularly to an improved spring-actuated safety brake and brake mounting used as an auxiliary brake in conjunction with a primary fluid pressure braking system on vehicles such as trucks, trailers, and buses which employ pneumatic brakes.

The problem of insuring a safe braking system is one which is rapidly becoming acute in view of the increasing use of trucks to handle shipments of freight. It is alarmingly common for newspapers to carry sordid accounts of trucks going out of control, and despite extreme skill in steering and adept downshifting of transmission gears in efforts to curb the ever increasing speed of such runaway trucks, the driver is powerless to avoid catastrophe. Short of a miracle, the end result is always the same—destruction of lives and property.

This problem has long been recognized in the industry, and many devices have been fathomed on the drawing boards, and several have reached production stage, but their weaknesses inhere in their complication, cost, and uncertainty of fast and effective operation. Many times suce devices are weak in several or all of these regards.

Attempts to provide safety include the use of several types of cylinders having spring-actuated pistons. These cylinders, however, are impractical when mounted on vehicles because of their linkage and mountings. Actuation of the piston must be immediate if failure occurs in the primary system, and to be immediate it requires simplicity of operation, short linkage, and certainty of response. Because of ice and slush often encountered on highways, or because of rust, friction, or weight, the linkage as developed in the past could very well become inoperative and on failure of the primary system, the emergency system would itself necessarily fail to operate.

Simplicity of movement and mounting, therefore, are paramount if the auxiliary brake is to provide any degree of safety to these vehicles at a reasonable cost of installation.

Another safety feature which is of paramount importance is that when trailers are equipped with this invention the wheels of the trailer become locked automatically when the air pressure is released, as when the tractor is uncoupled from the trailer. With the trailer brakes thus engaged, there is no need to block the wheels with chocks, stones, or sticks to prevent rolling, which of course is a dangerous practice. Neither is there any need to hook the hose to the trailer from the tractor prior to hooking the tractor to the trailer, for with the trailer brakes automatically set, there can be no roll back, or runaway trailer.

Vehicles equipped with this safety equipment cannot move until air pressure is built up to a safe operating pressure. This insures that the driver will not move the vehicle until there is a safe operating pressure to engage the brakes—another safeguard, obviously.

An object of this invention is to provide for automatic braking of a vehicle having fluid pressure brakes in the event of a pressure failure.

Another object is to provide an auxiliary cylinder mounted to automatically set the brake in the event of a pressure failure in the primary brake system.

Another object is to provide an auxiliary cylinder mounted to automatically operate the trailer brakes when the tractor is uncoupled from the trailer.

Another object is to provide a bracket capable of universal application on vehicles having fluid pressure operated brakes.

Another object is to provide a bracket and auxiliary cylinder combination which is inexpensive to manufacture and which is easy to mount on existing vehicles.

It is a further object to have the auxiliary cylinder mounted on the axle for close coupling to the brake lever of the primary system to avoid the dangers of slow actuation and/or failure of the auxiliary brake due to ice, rust, mud, or other friction in the linkage.

These and other objects and advantages of the invention will become apparent in studying the accompanying drawings wherein like characters of reference designate corresponding parts throughout the several views.

FIG. 1 is a plan view of the rear portion of a truck or trailer chassis equipped with conventional pneumatic brakes and with spring-actuated emergency brakes embodying the present invention; all shown diagrammatically;

FIG. 2 is a plan view in longitudinal section of the safety cylinder mounted on a vehicle axle;

FIG. 3 is a side view in longitudinal section of the safety cylinder additionally showing the piston in the extended position taken when applying the brakes;

FIG. 4 is a sectional view taken on the line 4—4 of FIG. 3;

FIG. 5 is a showing of the cam arrangement for actuating the brake shoes for bringing them into frictional contact with the brake drum;

Figure 6:
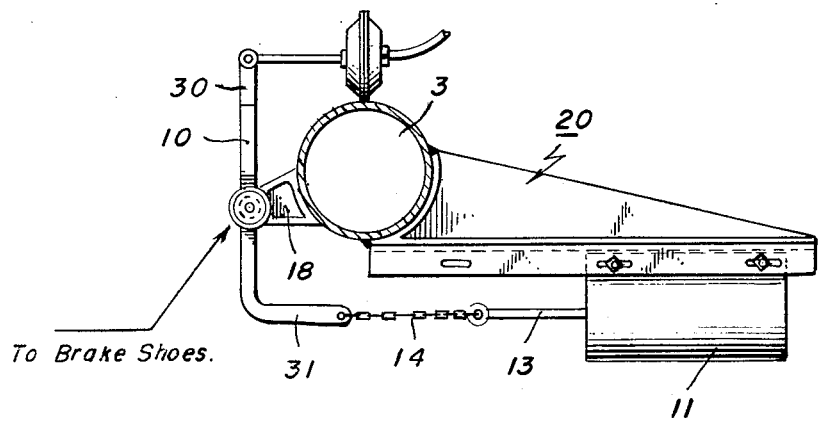
Figure 7:
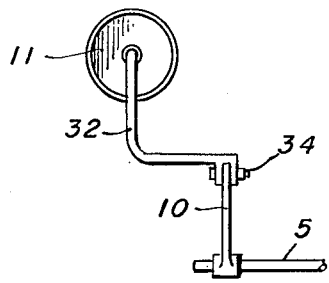
Figure 8:
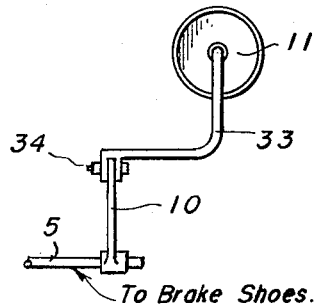
Figure 9:
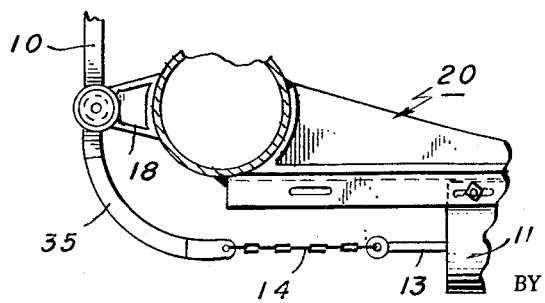

FIG. 6 is a modification showing the auxiliary cylinder mounted below the axle, with an adapter welded to the bottom of the brake lever and extending at a right angle to bring it into alignment with the bore of the auxiliary cylinder. Another adapter is used to extend the top of the brake lever. The bracket holding the brake lever has been mounted near the bottom of the axle;

FIG. 7 illustrates the use of an angular adapter on the brake lever, the upper end of which adapter is coupled to the auxiliary brake cylinder for use where the auxiliary cylinder must be mounted to the left of the brake lever;

FIG. 8 illustrates the use of an adapter like that shown in FIG. 7 used to offset the lever to the right; and FIG. 9 shows the brake lever mounting located near the middle of the axle with the brake lever extended by an adapter and curved to align it with the bore of the auxiliary cylinder.

FIG. 1 of the drawings shows the rear portion of a trailer chassis 1 mounted on rear wheels 2 carried by an axle 3 between them. Springs 4 support the frame on the axle. Wheels 2 are provided with brake drums 29 within which the usual brake shoes 28 are provided (FIG. 5).

Each of the shafts 5 supported by bracket 6 may be rotated to apply the brakes by means of a pneumatic cylinder 7 with a piston rod 8 which projects on pneumatic pressure being supplied to the cylinder. The end of the rod 8 is connected by a clevis 9 to a lever 10 (FIG. 3) fixed to the shaft 5. FIG. 5 shows cam 27 mounted on shaft 5 for actuation of brake shoes 28 with drum 29 for applying braking action. All of this structure is conventional.

According to the present invention, an auxiliary cylinder 11 having a flange 11a and piston 12 mounted on one end of rod 13, the opposite end of the rod being secured by a chain 14 to the brake lever 10. Piston 12 is normally forced to the end of the cylinder by compression spring 15, and when the compression spring 15 is so extended it applies the vehicle brakes by moving lever 10 in the same direction of travel said lever would normally be moved if the cylinder 7 were applying the brake, best seen in FIGS. 2 and 3.

To prevent the spring 15 from applying the brake except in an emergency, one end of cylinder 11 is fitted with a connection 16 and hose 17 leading to a connection with the reservoir (not shown), so that during normal operation the pressure in the reservoir is sufficient to force piston 12 down and compress spring 15 preventing the piston from engaging the brake.

To support the emergency cylinder 11 in a position opposite the brake lever from the primary cylinder a suitable bracket 20, or a similar one with adjustable features, is provided, as, for example, one being made in one or more pieces with rails 21 and 22 having adjustment slots 23, 24, and 25 in those rails, said rails engaging flange 11a of the cylinder, in tongue-and-groove fashion, by means such as the bolts 26. The adjustment slots 23, 24, and 25 permit the emergency cylinder to be adapted to any type of vehicle without the necessity of having several different brackets. When properly adjusted, the distance between the cylinder 11 and brake lever 10 is such that there is no slack in chain 14. When properly adjusted at the time of initial installation, no further adjustment is necessary.

Bracket 20 is secured to the axle by welding or by clamps or other means depending on the modification of the bracket. As such it can without difficulty be adapted to fit all known trucks or trailers regardless of the type of axle used whether it be round, square, or I-shaped, or of any other type, or whether the axle be that of the tractor or the trailer.

Regardless of the shape of brake lever 10, the slots in the bracket assembly provide for a wide range of adjustments. A brake lever adapter may at times be helpful as not all brake levers will be of exactly the shape illustrated in the accompanying drawings. Such adapters on the lever can be provided in a variety of shapes to provide a place for attaching the chain, and to insure that the angle is correct for applying the brakes.

FIGS. 6 through 9 illustrate adapters which may be used when mounting the bracket 20 on axles in different ways as is necessary when working with various makes and models of vehicles.

In FIG. 6 the brake lever has been extended upwardly by adapter 30 and the mounting 18 for the brake lever has been lowered in relation to the axle. Adapter 31, an L-shaped piece, is then welded to the bottom of brake lever 10 and connected to chain 14. This is made necessary where as here the auxiliary cylinder needs to be mounted below the axle.

FIGS. 7 and 8 show adapters 32 and 33 which offset the brake lever to the left or right to allow the end of the lever to be aligned with the auxiliary cylinder. These adapters are angular pieces which are fastened to the top of the brake levers by bolts 34.

FIG. 9 pictures a curved adapter 35 welded to the bottom of brake lever 10 to allow the auxiliary cylinder to be properly positioned with relation to the lever. Here also the auxiliary cylinder is mounted below the axle, but in this case the bracket 18 holding brake lever 10 is mounted higher on the axle than it is in FIG. 6 and so a different type of adapter is necessary.

Of course as vehicles change so such adapters will change, but it is apparent that by their use this auxiliary cylinder and bracket on which it is mounted can be used universally.

The bracket may be mounted on the axle in any position above, behind, in front of, or below the axle without requiring any basic modification. The bracket may be mounted on the axle directly or on any shelf, or intermediate extension from the axle. In any event it is essential that the distance between cylinder 11 and brake lever 10 does not vary substantially when the vehicle is on the road under actual operating conditions.

The method of operation is best shown in FIG. 3 where it can be seen that normally when the pressure in line 19 is sufficient to engage the brakes the pressure in the reservoir is entering line 17 forcing the piston 12 toward the opposite end of the cylinder 11 from that of the line and so compressing spring 15. In this way the emergency system is kept from engaging the brake. However, if for any reason there should be a pressure drop in the reservoir there would be a corresponding drop in pressure in emergency line 17 and the spring 15 would force piston 12 toward the end of the cylinder and so engage the brake automatically through linkage 13 and 14 and brake lever 10. Operation is instantaneous, insuring maximum safety. There are no complicated linkages or bends in the linkage between piston 12 and brake lever 10, and as a result there is little if any friction in operation. There are no spots to become inoperative because of rust, dirt, slush and other elemental road hazards. When pressure in the reservoir drops, the piston 12 moves to emergency direction, and moves to normal position as soon as pressure begins to recover. The connecting chain 14 and rod 13 are constantly kept in operative condition to further insure dependability of the emergency system.

It is to be understood that the form of the invention herewith shown and described is to be taken as a preferred example of the same and that various changes in the size, shape and arrangement of the parts may be resorted to without departing from the spirit of the invention or the scope of the appended claims.

We claim:

1. In a brake system having a fluid pressure actuated cylinder operatively connected with a brake lever associated with braking means located at a vehicle wheel mounted on an axle, a reservoir for storing fluid under pressure, the improvement consisting of a bracket attached to the axle in substantially the same vertical plane as the brake lever, said bracket holding an auxiliary cylinder having a spring-actuated piston and piston rod, said auxiliary cylinder having a flange on its exterior, fastening means securing said flange to the bracket, and direct straight-line connecting means for connecting the piston rod to the brake lever for actuating the brakes in the event of a pressure drop in the said reservoir by the spring pushing the piston to its extended position, the flange of the auxiliary cylinder and the bracket embodying a tongue-and-groove relationship and the bracket having slots in its groove portion to allow adjustment of the auxiliary cylinder.

2. A device as set forth in claim 1 wherein the means for attaching the piston rod to the brake lever consists of a chain.

3. A device as set forth in claim 1 wherein the spring for actuating the piston is helical.

4. A device as set forth in claim 3 wherein the means for attaching the piston rod to the brake lever consists of a chain and the chain extends from the auxiliary piston rod in substantially the same direction as the said rod.

5. In a brake system having a fluid pressure actuated cylinder operatively connected with a brake lever associated with braking means located at a vehicle wheel mounted on an axle, a reservoir for storing fluid under pressure, the improvement consisting of a bracket attached to the axle in substantially the same vertical plane as the brake lever, said bracket holding an auxiliary cylinder having a spring-actuated piston and piston rod, said auxiliary cylinder having a flange on its exterior, fastening means securing said flange to the bracket, and means for connecting the piston rod to the brake lever for actuating the brakes in the event of a pressure drop in the said reservoir by the spring pushing the piston to its extended position, a brake lever adapter where necessary to allow proper alignment of said auxiliary cylinder with said lever, the flange of the auxiliary cylinder and the bracket embodying a tongue-and-groove relationship and the bracket having slots in its groove portion to allow adjustment of the auxiliary cylinder.

(References on following page)

References Cited in the file of this patent

UNITED STATES PATENTS

| | | |
|---|---|---|
| 1,997,807 | Bird | Apr. 16, 1935 |
| 2,645,313 | Schaadt | July 14, 1953 |
| 2,673,483 | Bird | Mar. 30, 1954 |
| 2,809,723 | Howze | Oct. 15, 1957 |
| 2,854,954 | Howze | Oct. 7, 1958 |
| 2,862,583 | Granche | Dec. 2, 1958 |
| 2,934,380 | Julier et al. | Apr. 26, 1960 |

FOREIGN PATENTS

| | | |
|---|---|---|
| 687,793 | Great Britain | Feb. 18, 1953 |